(12) United States Patent
Moller

(10) Patent No.: US 8,875,424 B2
(45) Date of Patent: Nov. 4, 2014

(54) END BIT FOR A SOIL-WORKING TOOL

(75) Inventor: Per H. Moller, Soro (DK)

(73) Assignee: Mollsor APS, Soro (DK)

( * ) Notice: Subject to any disclaimer, the term of this patent is extended or adjusted under 35 U.S.C. 154(b) by 66 days.

(21) Appl. No.: 13/698,236

(22) PCT Filed: May 16, 2011

(86) PCT No.: PCT/DK2011/050163
§ 371 (c)(1),
(2), (4) Date: Jan. 4, 2013

(87) PCT Pub. No.: WO2011/144211
PCT Pub. Date: Nov. 24, 2011

(65) Prior Publication Data
US 2013/0091745 A1    Apr. 18, 2013

(30) Foreign Application Priority Data

May 19, 2010    (DK) .................................. 2010 70209

(51) Int. Cl.
*E02F 9/28* (2006.01)
*A01B 15/06* (2006.01)
*A01B 23/02* (2006.01)

(52) U.S. Cl.
CPC .............. *E02F 9/2808* (2013.01); *A01B 15/06* (2013.01); *A01B 23/02* (2013.01)
USPC .......................................................... 37/452

(58) Field of Classification Search
USPC .............. 37/446, 452–460; 172/701.1–701.3
See application file for complete search history.

(56) References Cited

U.S. PATENT DOCUMENTS

| 783,764 | A | * | 2/1905 | Thomas | 37/452 |
| 1,202,806 | A | * | 10/1916 | Clark, Jr. | 37/452 |
| 2,040,085 | A | * | 5/1936 | Fykse et al. | 37/452 |

(Continued)

FOREIGN PATENT DOCUMENTS

| EP | 1 900 269 A1 | 3/2008 |
| GB | 641 825 A | 8/1950 |

(Continued)

OTHER PUBLICATIONS

International Search Report for PCT/DK2011/050163, dated Sep. 14, 2011.
Denmark Search Report for corresponding priority application PA 2010 70209, dated Dec. 23, 2012.

*Primary Examiner* — Robert Pezzuto
(74) *Attorney, Agent, or Firm* — Knobbe, Martens, Olson & Bear, LLP

(57) ABSTRACT

The invention relates to a replaceable end bit for a soil-working tool, which end bit is retained by friction and wherein, at its trailing edge, the end bit is provided with one or more openings that is/are oriented rearwardly relative to the end bit and for receiving couplers from a holder part. The openings may have rounded faces, and the faces may face towards each other. The distance between the rounded faces is increased with the distance from the trailing edge of the end bit. The invention also relates to a holder part for a replaceable end bit for a soil-working tool, which end bit is retained by friction, and wherein the holder part is provided with pairs of protruding couplers, which protruding couplers are provided with a space, where the distance between the two protruding couplers is reduced with the distance from their end faces.

6 Claims, 9 Drawing Sheets

(56) References Cited

U.S. PATENT DOCUMENTS 2,047,862 A 7/1936 Drummond
2,690,112 A 9/1954 Frevik
3,897,642 A 8/1975 Helton et al.
4,754,816 A 7/1988 Edmission

FOREIGN PATENT DOCUMENTS

| GB | 653 148 A | 5/1951 |
| GB | 678 382 A | 9/1952 |
| GB | 1272955 A | 5/1972 |
| WO | WO 01/56360 A1 | 8/2001 |

* cited by examiner

Section A-A

Section B-B

END BIT FOR A SOIL-WORKING TOOL

FIELD OF THE INVENTION

The invention relates to a replaceable end bit for a soil-working tool, which end bit is retained by friction, where the end bit is, at its trailing edge, provided with one or more openings that is/are oriented rearwardly relative to the end bit and for receiving coupler(s) from a holder part which openings has/have rounded faces.

The invention also relates to a holder for a replaceable end bit for a soil-working tool, which end bit is retained by friction, where the holder part is provided with a pair of protruding couplers, which protruding couplers are provided with a space, where the distance between the two protruding couplers is reduced with the distance from their end faces and where the protruding couplers are provided with rounded faces that face towards each other.

BACKGROUND OF THE INVENTION

For soil-working tools, such as ploughs, harrows, subsoilers (soil decompactors), seed drills, dippers or grabs for excavators, one used to either weld new end bits onto them or to replace screwed-on end bits when one or more end bits of the tool had been worn down.

For such tools, reversible end bits or reversible wear parts are known. The advantage of being able to reverse a wear part is that the longevity of the wear part is thereby prolonged.

To make it easy and fast to reverse such reversible end bit, numerous attempts have been made to provide some kind of "Knock On-Knock Off" system enabling attachment of a wear part to a holder by some kind of wedging connection.

Such attachment of a replaceable wear part is known from EP 1 259 105 B2. There, the wear part is attached to a leading edge of a working tool in that wear part and leading edge on a working tool have co-operative guide formations extending generally perpendicular to the leading edge and which provide an inter-fitting wedging connection for engagement of the wear part on the working tool.

Therein, those guide formations are defined by walls or faces which are each of V-shape in cross-section and configured to oppose rotation of the wear part about its longitudinal axis.

It is a drawback of such V-shape that, if the "male" and the "female" parts do not inter-fit completely, in case eg a burr or the like should be present on just one of the faces, or if a hard object should become wedged between two faces intended for resting against each other, one would experience that the intended interface contact is not established, but rather a pointwise contact, which may entail that the wear part is not attached in a reliable manner.

That can be seen e.g., by the wear part being, when it is no longer exposed to an influence from the soil to the effect that the wear part is pressed into its wedge-shaped bed, at risk of falling off the working tool when the latter is taken from e.g., one plot of land to another.

From GB 641 825 A is known a changeable/renewable point (cap) for a plough share. The cap is held in place by means of a grub screw. Further the cap is retained in position by a metal strap. One end of the strap is looped around an anchorage in the cap and the other end of the strap is attached to the frog or other part of the plough by a fastener means such as, for example, a bolt passing through a hole in the other end of the strap.

GB 641 825 A also discloses that the cap at its trailing edge is provided with one or more openings that is/are oriented rearwardly relative to the end bit and for receiving coupling means from a holder part.

From GB 678 382 A is known a holder part for retaining a point by friction, where the holder part is provided with a pair of protruding coupling means, which protruding coupling means are provided with a space, where the distance between the two protruding coupling means is reduced with the distance from their end faces.

The point and the holder part are provided with v-shaped as well as D-shaped (rounded) surfaces for engagement. A pin is inserted between the point and the holder part in order to retain the point in the holder part during use of the plough.

SUMMARY OF THE INVENTION

In accordance with the invention, the above drawbacks are obviated by providing a bit end or wear part with a rearwardly oriented opening for receiving a pair of protruding couplers, e.g., on a holder part, said protruding couplers being provided with a space where the distance between the two protruding couplers is reduced with the distance from the end faces thereof. In the rearwardly oriented opening of the end bit, a central part is arranged which has rounded faces that form a hollow towards each other. The distance between those rounded faces is increased with the distance from the trailing edge of the end bit.

Thus, the end bit is, at its trailing edge, provided with one or more openings that is/are rearwardly oriented relative to the end bit end for receiving coupler(s) from a holder part.

This is achieved by a replaceable bit according to the above where the bit comprises two rearwardly oriented openings with rounded faces, which faces face towards each other and that the distance between the rounded faces is increased with the distance from the trailing edge of the end bit.

Furthermore, attachment of an end bit in a holder part is obtained by having a holder part for a replaceable end bit for a soil-working tool, which end bit is retained by friction, wherein the holder part is provided with a pair of protruding couplers, which protruding couplers are provided with a space, wherein the space between the two protruding couplers is reduced with the distance from their end faces.

This is achieved in that on the holder part at a bottom of the protruding coupler(s), between the rounded faces, an abutment is provided for a tool for use in the dismounting of an end bit when the tool is inserted through a longitudinally extending hole or a slot in the end bit.

Hereby a kind of wedging connection is accomplished that enables attachment of the end bit to the holder part by impacting the end bit with a hammer or a like tool for achieving the requisite retainer force.

The end bit may be configured such that the rounded faces arranged in the rearwardly oriented opening of the end bit are arranged essentially in a central plane, seen in the longitudinal direction of the end bit.

The end bit may also be configured such that, at the trailing edge of the end bit, a slot or an elongate hole is provided for insertion of a tool for dismounting of the end bit from the holder part.

The holder part may be configured such that the protruding coupler(s) are provided with rounded faces that face towards each other.

The holder part may be configured such that, along at least a portion of a longitudinal expanse of at least one of the protruding coupler(s), a material elevation extends.

The holder part may also be configured such that the holder part comprises an edge at a distance from the protruding coupler(s) where the height of material has been increased relative to the height of material on the protruding coupler(s).

By way of the configuration with the rounded faces in mutual engagement via friction it is accomplished that, if the corresponding, rounded faces from holder part and end bit, respectively, do not correspond completely to each other, the faces will have mutual contact throughout a larger expanse than in case plane faces were concerned.

This is due to the rounded shape. Rounding radii for the rounded portions in the rearwardly oriented opening of the end bit and rounding radii for the protruding coupler(s) arranged on the holder part need not be the same to provide an acceptable contact between end bit and holder part.

Obviously, the more the rounding radii for the faces to be brought into contact with each other approximate the same radius, the larger the contact face between the rounded portions in the rearwardly oriented opening of the end bit and the rounded portions on the protruding coupler(s) arranged on the holder will be.

By positioning the rounded portions arranged in the rearwardly oriented opening of the end bit substantially in a central plane seen in the longitudinal direction of the end bit, it is accomplished that the end bit can be reversed 180 degrees and hence be used on more than one side.

The end bit or the wear part is secured and retained in a holder part. The holder part may be a part of a plough body, or the holder part may be a separate part that can be attached to the plough body by detachable bolts or by rivets.

Likewise, the holder part may be a part of a harrow tine or a subsoiler (soil decompactor) or the holder part may be a separate part that can be attached to the harrow tine or the subsoiler by detachable bolts or by rivets.

One or more holder parts may also be attached to an edge of a dipper or grab for an excavator, said edge being intended for engaging with soil or other material to be worked or removed.

Furthermore, the holder part may, according to a particular embodiment, be attached to a plough body, a harrow tine or a grab, respectively, by an integrated self-locking connection on a plough body, a harrow tine or a grab, eg in the shape of a T-groove, where the otherwise parallel faces of at least one pair converge at least over a distance along the guide.

When the end bit has become so worn that it needs to be reversed or replaced, a tool is inserted in a slot in the trailing end of the end bit, said slot being provided such that its innermost edge or bottom is situated to face the space between the protruding coupler(s).

The tool may be some kind of mandrel or the like that can be inserted in the slot and thereby wrench the end bit to loosen it from the coupler(s).

Then the end bit is reversed and mounted anew or, if the end bit is completely worn, the end bit is exchanged and a new one is fitted.

The holder part may be configured with a larger material thickness where the end bit does not engage with the coupler(s) to the effect that the transition from end bit to holder part, when the end bit is fitted, extends such that the surfaces have essentially the same height in the transition.

When the holder part is worn along with the first new end bit, the two parts are worn at essentially the same rate. When the end bit has been worn on both sides and is substituted for a new end bit, the thickness of the end bit will be larger than the thickness of the holder. That means that, now, since the material from the end bit extends beyond the holder of the material, the holder is now "in the lee of" the end bit. Hereby the abrasive effect of the soil on the holder part is reduced.

The most comprehensive wear on the end bit will occur at that end of the end bit that faces away from the holder part. Therefore, in pace with the end bits being replaced, they provide protection for the holder part and hence impart extended longevity to it.

The coupler(s) of the holder part sit protected within the rearwardly oriented opening of the end bit for receiving the coupler(s) from the holder part.

Both end bit and holder part may be provided with a wear indicator telling when the time has come to replace the part.

The indicator may be provided in the form of a bottom hole formed by hot pressing, welding or moulding of end bit or holder part, or it may be provided by subsequent machining treatment. When there is no longer a difference in level between the hole and the surrounding material, the time has come to replace the part on which the indicator is situated.

The indicator may also be configured along the rim of the slot in the end bit used when the end bit is dismounted.

BRIEF DESCRIPTION OF THE DRAWINGS

The invention will now be described in detail with reference to the drawing, wherein.

DETAILED DESCRIPTION OF THE PREFERRED EMBODIMENT

Figure 1:
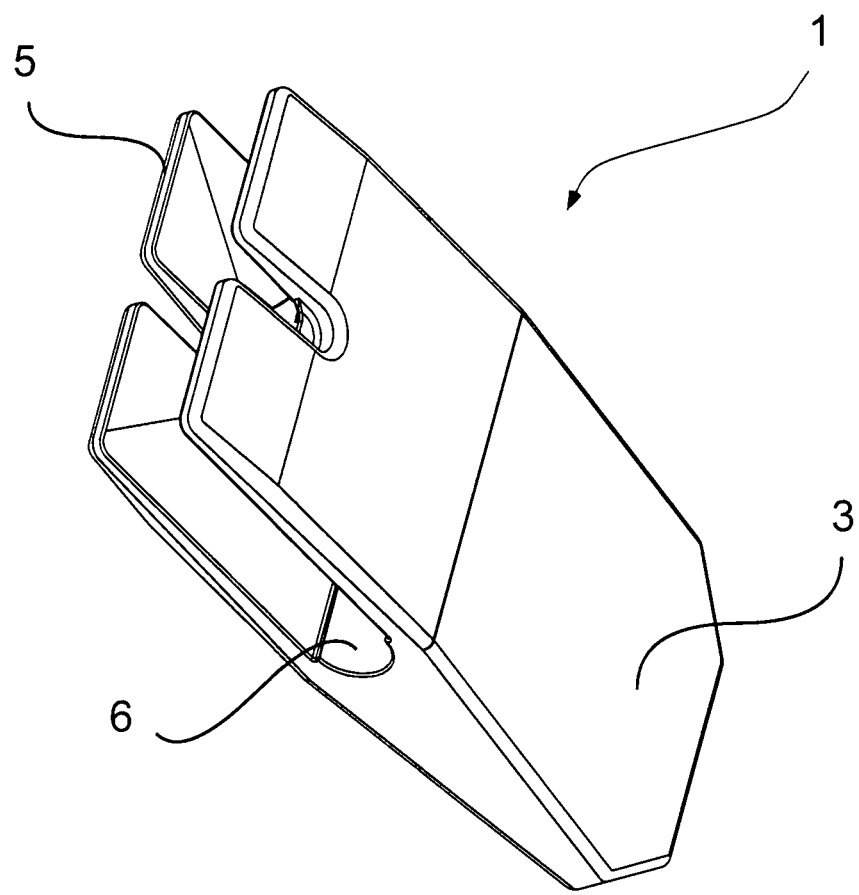
FIG. 1 shows an end bit, seen in a perspective view.
Figure 2:
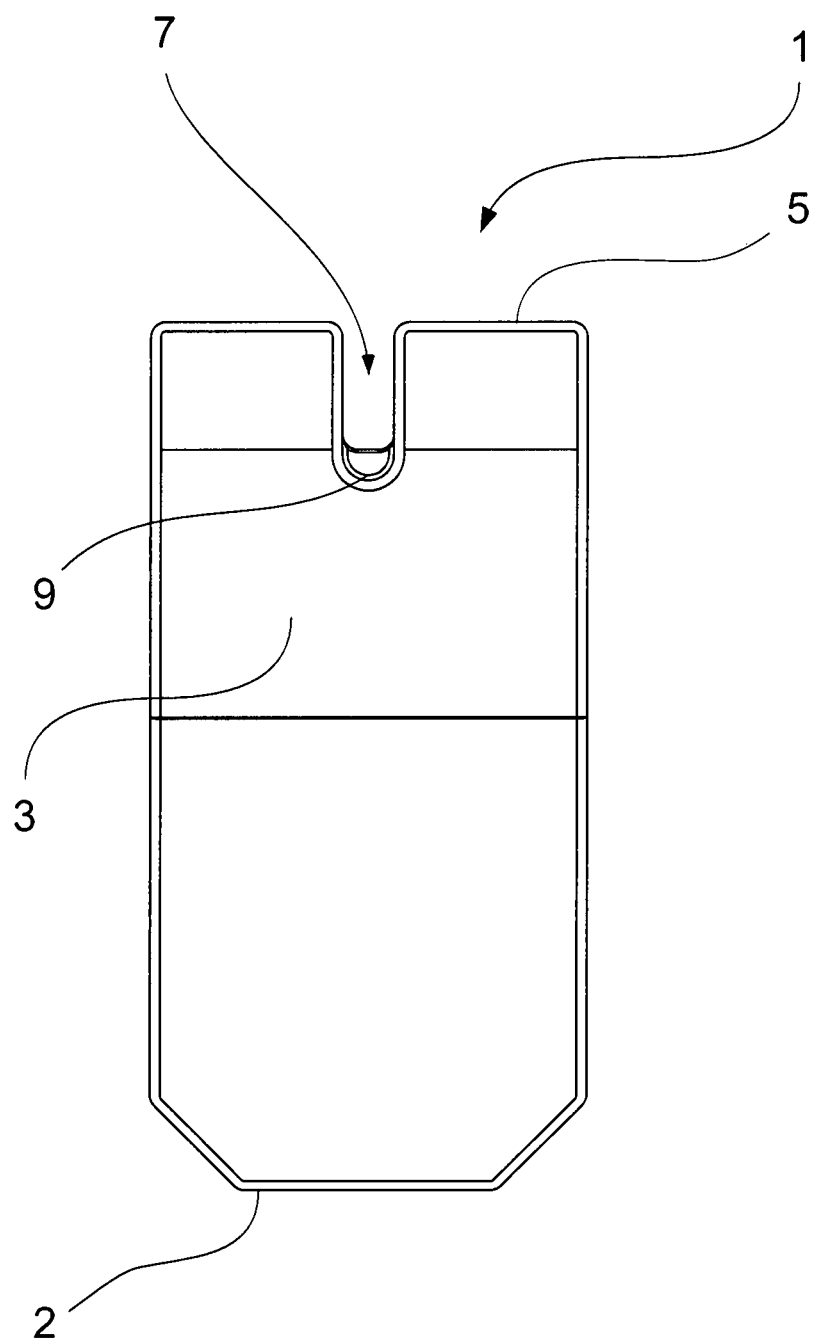
FIG. 2 shows an end bit, seen from the one side.
Figure 3:
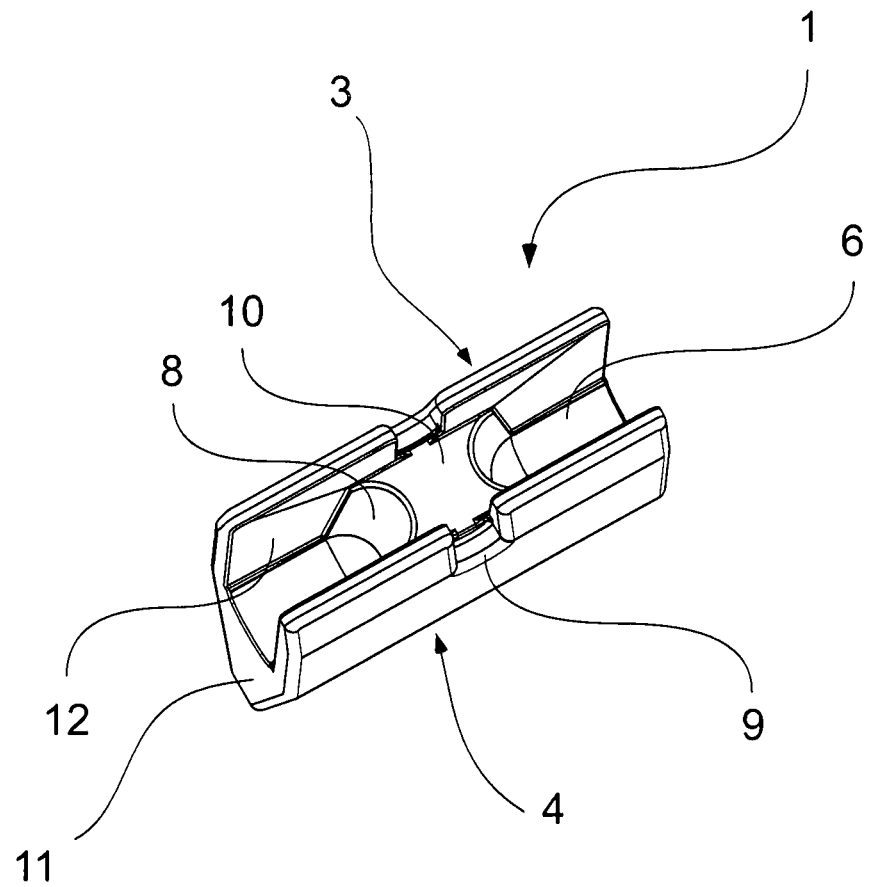
FIG. 3 shows an end bit, seen from behind in a perspective view.
Figure 4:
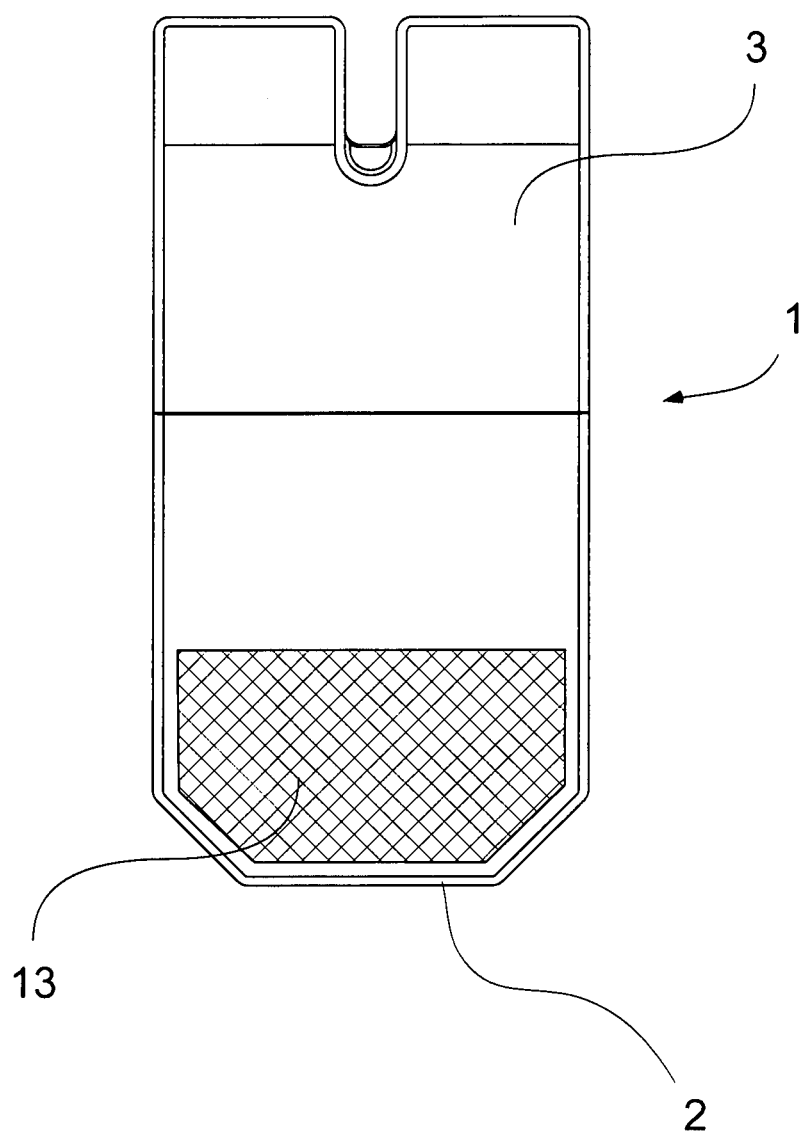
FIG. 4 shows an end bit like in FIG. 2, but wherein the wear part is, in its soil-working end portion, provided with a reinforcing coating.
Figure 5:
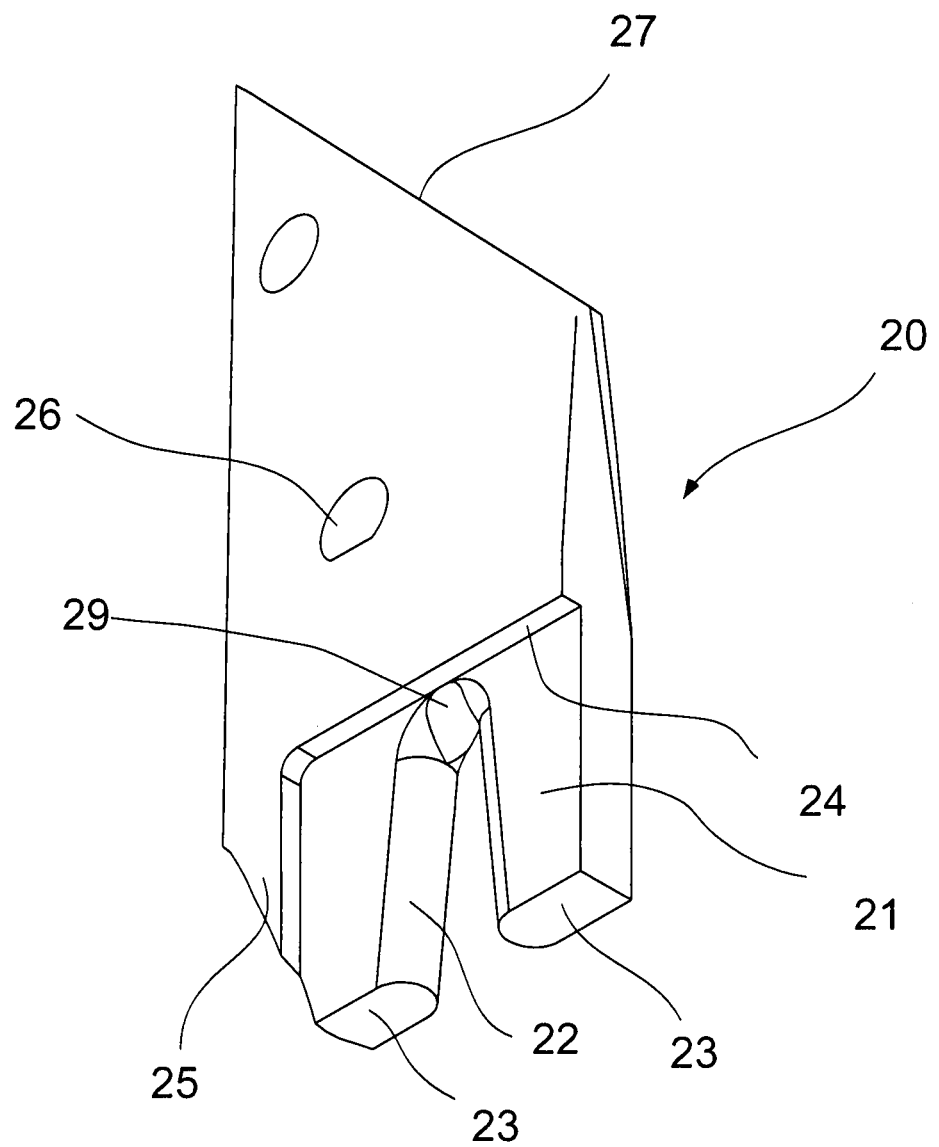
FIG. 5 shows a holder part for an end bit, wherein the holder part is seen in a perspective view.
Figure 6:
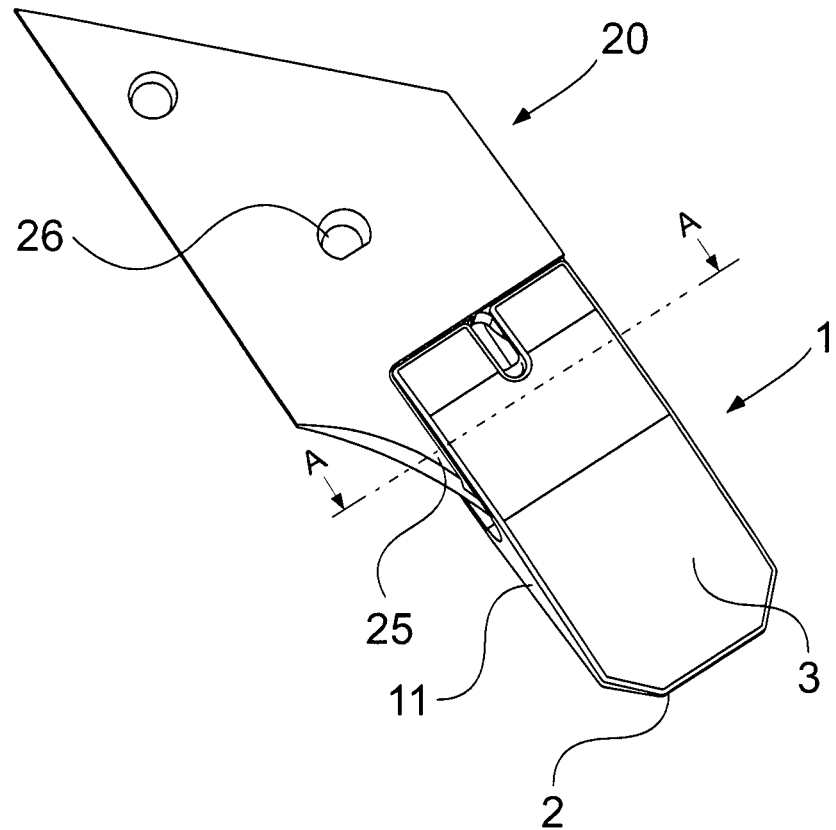
FIG. 6 shows the holder part of FIG. 5, with a mounted end bit.
Figure 7:
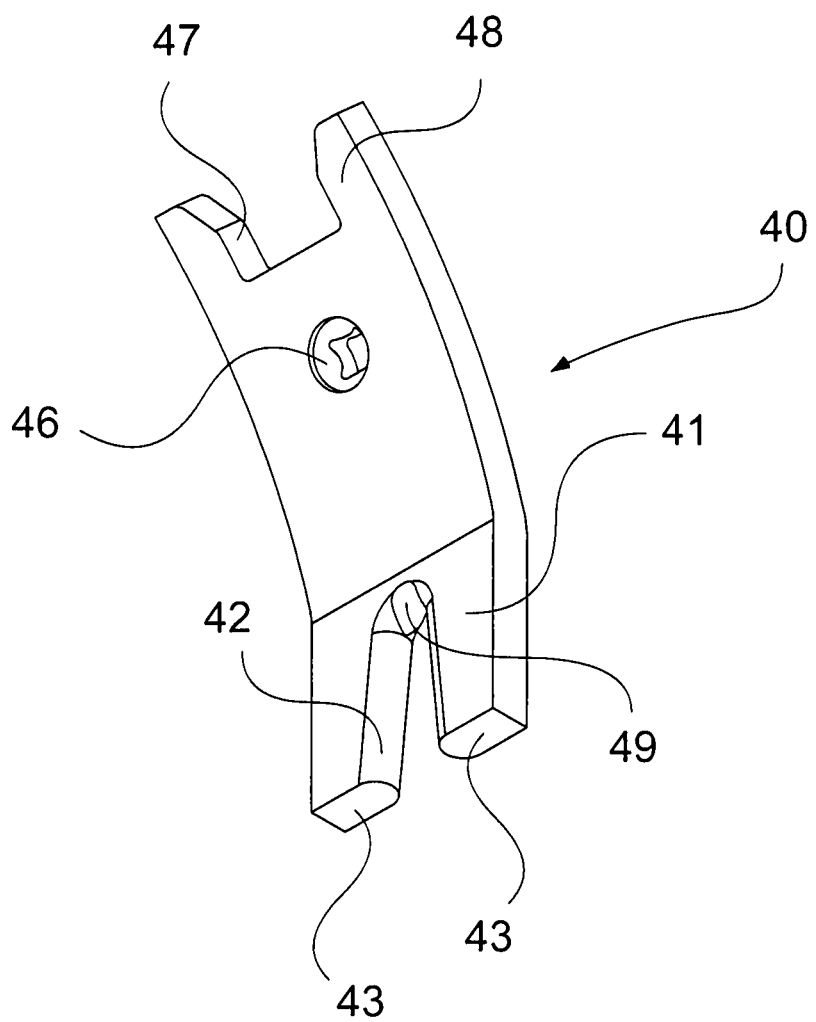
FIG. 7 shows a second holder part for an end bit, wherein the holder part is seen in a perspective view.
Figure 8:
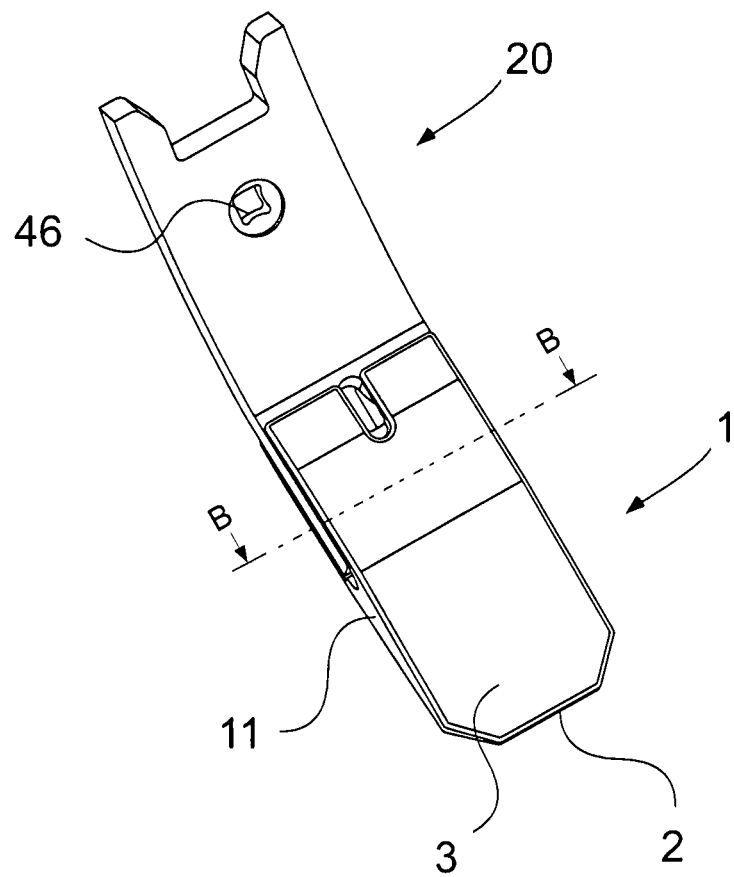
FIG. 8 shows the holder part of FIG. 7, with a mounted end bit.
Figure 9:
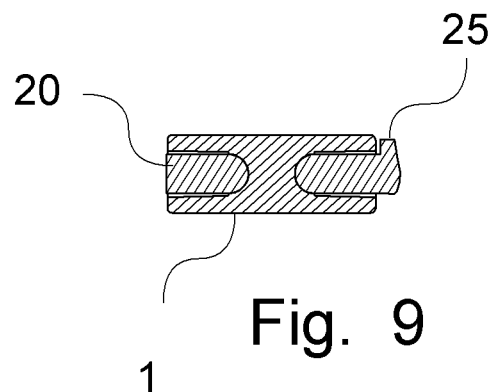
FIG. 9 shows a section A-A through holder part and end bit, as shown in FIG. 6.
Figure 10:
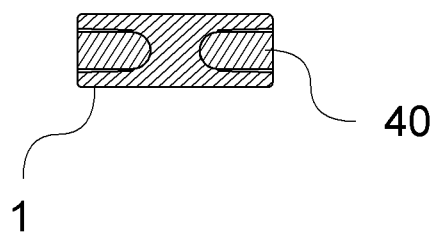
FIG. 10 shows a section B-B through holder part and end bit as shown in FIG. 8.

Now convenient embodiments of the invention will be described.

An end bit 1 for a soil-working tool comprises an edge 2 or the like, which edge 2 is intended for engaging with the soil, and a first wear face 3 and a second wear face 4.

At its trailing edge 5, the end bit 1 is provided with one or more openings 6 for receiving coupler(s) 21, 41 from a holder part 20, 40.

Likewise, the end bit 1 can be provided with a longitudinally extending hole or a slot 7, wherein a tool (not shown) can be inserted to the effect that the end bit 1 can be released from its engagement with the coupler(s) 21, 41 of the holder part 20, 40.

In connection with the bottom of the slot 7, a kind of step 9 or the like may be provided which may serve as wear indicator. The wear indicator operates by it being possible to see when the material on the first wear face 3 of the end bit is flush with the step 9, which is when the time has come to reverse the end bit or replace it. The same will apply with the second wear face 4 of the end bit 1, in case a reversible end bit is concerned, since, advantageously, a wear indicator will be present on both surfaces.

In case there is only one rearwardly oriented opening 6, it is provided with a kind of central part 10 with rounding parts 8, whose rounded portions face towards each other, them forming concave faces. The end bit 1 may be provided with closed sides 11 or with sides that are open from the bottom of the rearwardly oriented opening(s) 6.

The rounded faces 8, whose rounded portions face towards each other, may, in one embodiment, be at a distance which is increased with the distance to the trailing edge 5 of the end bit 1.

According to another embodiment, the rounded faces 8 may be conical with a rounding radius that decreases with the distance to the trailing edge 5 of the end bit 1.

The internal faces 12 extending from the sides 11 of the end bit and to the rounded portions 8 may be parallel, or they may be at a distance relative to each other which is reduced with the distance from the edges 11 of the end bit.

The one or more rearwardly oriented openings 6 is/are, along with the end bit 1, configured for receiving coupler(s) from a holder part 20, 40, where the holder part 20, 40 is provided with a pair of protruding couplers 21, 41, said protruding couplers 21, 41 being provided with a space, where the distance between the two protruding couplers 21, 41 is reduced with the distance from their end faces 23, 43.

The protruding coupler(s) 21 may be provided on a holder part for being attached to a plough, where the holder part is configured such as to mate with the geometry of the plough and may be attached to the plough.

The protruding coupler(s) 41 may also be provided on a holder part for attachment to a harrow or a subsoiler (soil decompactor), wherein the holder part is configured such as to mate with the geometry of a subsoiler tine or a harrow tine and may be secured thereto.

In case of a holder part 20 for a plough, the protruding coupling parts 21 extend at least partially in the advancement direction of the plough with a number of substantially flat end pieces 23. The parts of the protruding coupler(s) that face towards each other are constituted of rounded faces 22. At the end of the holder part 21 that faces away from the protruding coupling parts, the holder part 21 is provided with an abutment face 27 for abutment on an abutment face on the plough, whereby the holder part can be retained in a given position relative to the tool.

At the end of the protruding coupler 21 that faces away from the end faces 23, there may, according to one embodiment, be provided an edge 24 where the height of material is increased relative to the height of material on the protruding coupler 21.

According to one embodiment, at least along a part of a longitudinal expanse of at least one of the protruding coupler 21, an elevation of material extends, which material is preferably of the same material as the holder part. On its surface, the holder part may be coated with a wear-reducing and/or longevity-prolonging material.

In case of a holder part 40 for a harrow or a subsoiler, the protruding coupler 41 extend at least partially in the direction of advancement of the harrow or the subsoiler with a number of substantially flat end pieces 43. Those parts of the protruding coupler(s) that face towards each other are constituted by rounded faces 42. At the end of the holder part 41 that faces away from the protruding coupling parts, the holder part 41 is provided with abutment faces 47 formed on protrusions 48 for abutment against an abutment face on the harrow or the subsoiler, the plough, to the effect that the holder part can be retained in a given position relative to the tool. According to one embodiment, the holder part 40 may be provided with an edge (not shown), where the height of material is increased relative to the height of material on the protruding coupler 41.

At the bottom of the protruding coupler(s) 21, 41, between the rounded faces 22, 42, an abutment 29, 49 is provided for a tool for use in the dismounting of an end bit 1, either in case the end bit 1 is worn or in case it needs to be reversed and used anew.

According to one embodiment, the holder part 20, 40 is provided with one or more holes 26, 46 for securing the holder part 20, 40 to the tool.

According to one embodiment, the rounded faces 8, 22, 42 are partially circular or approximately partially circular.

According to one embodiment of a holder part 20, 40, the rounded faces 22, 42 may be conical with a rounding radius that increases with the distance from the end faces 23, 43 of the coupler(s) 21, 41.

The trailing edge 5 of the end bit 1 extends further upwards on the holder part 20, 40 than the bottom 29, 49 of the protruding coupler(s) 21, 41, to the effect that the first and second faces 3, 4 of the end bit 1 shield against wear on the coupler(s) 21, 41. Hereby it is obtained that the coupler(s) 21, 41 do not become worn, which contributes to considerably increasing the longevity of the holder part 20, 40.

If it is necessary to increase the strength of the joint between end bit 1 and holder part 20, 40, the rounded faces 8, 22, 42 may approximate portions of ellipses in order to provide a larger cross-section of the protruding coupler(s) 21, 41.

The holder part 20, 40 is configured to match the implement on which it is to be used, and in most cases it is fastened to the soil-working tool by screws or bolts, but it may also be mounted to the soil-working tool by other fasteners.

The holder part 20, 40 may also be mounted to the soil-working implement by welding, gluing, or other similar methods.

Another option for securing the holder part 20, 40 to the implement on which it is to be used is a longitudinally extending guide (not shown) having, at its one end, an open guide and wherein the remainder of the guide is provided with protruding edges that extend towards each other to the effect that the distance between those edges is smaller than the distance between the sides of the guide, where the latter is open.

By arranging e.g., a bolt or the like at the end of the guide where it is open, the sides that extend towards each other will retain the bolt in the longitudinally extending direction of the bolt, the bolt head having a larger expanse than the distance between the sides arranged on the guide and extending towards each other.

The bolt may be retained in the guide in that a piece of spring metal or the like can ensure that the bolt is not moved to that end of the guide where the distance between the sides is larger than the expanse of the bolt head.

If the bolt is to be removed from the guide, the spring metal is bent or turned to such extent that the bolt is capable of travelling to the open end of the guide, and the bolt can be removed from the guide.

On its one or both sides, the end bit 1 may be coated with carbide or other wear-reducing material 13 for prolonging the longevity of the replaceable end bit.

The invention claimed is:

1. A replaceable end bit for a soil-working tool, which replaceable end bit is configured to be retained by a holder part by friction, wherein a trailing edge of the replaceable end bit is configured with at least two openings that are oriented rearwardly relative to the replaceable end bit and wherein the at least two openings are configured to receive at least two couplers from the holder part, wherein each of the at least two openings have a rounded face, wherein concave surfaces of the rounded faces of the at least two openings face away from each other and wherein the distance between the rounded faces is increased with the distance from the trailing edge of the replaceable end bit.

2. A replaceable end bit according to claim 1, wherein the rounded faces that are arranged in the rearwardly oriented opening of the replaceable end bit are arranged substantially in a central plane seen in the longitudinal direction of the replaceable end bit.

3. A replaceable end bit according to claim 1, wherein, at the trailing edge of the replaceable end bit, a slot or an elongate hole is provided, wherein the slot or elongate hole is configured to permit insertion of a dismounting tool configured to dismount the replaceable end bit from the holder part.

4. A holder part for a replaceable end bit for a soil-working tool according to claim 1, where the holder part comprises a pair of protruding couplers, which protruding couplers comprise a space between the couplers, wherein distance between the two protruding couplers is reduced with distance from their end faces and wherein the protruding couplers comprise rounded faces that face towards each other, wherein, at a bottom of the protruding couplers, between the rounded faces, an abutment is configured to accommodate a dismounting tool configured to dismount the replaceable end bit when the dismounting tool is inserted through a longitudinally extending hole or a slot in the replaceable end bit.

5. A holder part according to claim 4, wherein, at least along a portion of a longitudinal expanse of at least one of the protruding coupler(s) in the pair of protruding couplers, an elevation of material extends.

6. A holder part according to claim 4, wherein the holder part comprises an edge at a distance from the protruding couplers, where a height of material is increased relative to a height of material on the protruding couplers.

* * * * *